United States Patent [19]

Su

[11] Patent Number: 5,344,714
[45] Date of Patent: Sep. 6, 1994

[54] LLDPE COMPOSITE FILM FREE OF MELT FRACTURE

[75] Inventor: Tien-Kuei Su, Belle Mead, N.J.

[73] Assignee: Mobil Oil Corporation, Fairfax, Va.

[21] Appl. No.: 971,120

[22] Filed: Nov. 4, 1992

[51] Int. Cl.$^5$ .............................................. B32B 27/08
[52] U.S. Cl. ................................... 428/516; 428/910; 428/35.7; 525/86; 525/240; 156/244.11
[58] Field of Search ............... 428/516, 500, 523, 910, 428/35.7; 156/244.11; 525/86, 240

[56] References Cited

U.S. PATENT DOCUMENTS

| | | | |
|---|---|---|---|
| 3,125,547 | 3/1964 | Blatz | 260/45.5 |
| 4,151,318 | 4/1979 | Marshall | 428/35 |
| 4,187,269 | 2/1980 | Hutchinson et al. | 264/171 |
| 4,282,177 | 8/1981 | Kurtz et al. | 264/564 |
| 4,399,173 | 8/1983 | Anthony et al. | 428/35 |
| 4,579,912 | 4/1986 | Canterino et al. | 525/240 |
| 4,713,205 | 12/1987 | Su | 264/176.1 |
| 4,824,912 | 4/1989 | Su | 525/240 |
| 4,826,920 | 5/1989 | Dobreski | 525/86 |

OTHER PUBLICATIONS

Ser. No. 07/971,135, filed Nov. 4, 1992 (Mobil Docket 6841), Ser. No. 07/971,120 (Mobil Docket 6843), Ser. No. 07/971,119 (Mobil Docket 6844) and Ser. No. 07/971,114 (Mobil Docket 6842), all filed Nov. 4, 1992.

*Primary Examiner*—Edith Buffalow
*Attorney, Agent, or Firm*—Alexander J. McKillop; Malcolm D. Keen; Marina V. Schneller

[57] ABSTRACT

In accordance with the invention a linear low density polyethylene is coextruded with a composition containing a LDPE and/or HDPE. The product film exhibits substantially no melt fracture and no surface defects.

21 Claims, No Drawings

LLDPE COMPOSITE FILM FREE OF MELT FRACTURE

FIELD OF THE INVENTION

This invention relates to a composite film comprising a layer of linear low density copolymer of ethylene and a minor amount of an olefin containing 4 to 10 carbon atoms (LLDPE), and to films of improved properties formed from such compositions. Also included in the invention is the process of forming films from such compositions. The resulting films are characterized by at least substantial retention of the desirable properties of the linear low density polyethylene and the substantial elimination of melt fracture of the film.

BACKGROUND OF THE INVENTION

Linear low density polyethylenes exhibit extremely desirable properties in film products. However, processing characteristics of the linear low density polyethylene (LLDPE) are not equal to the inherent properties of the resin itself. Commercial application of LLDPE resins is limited partly because of extrusion problems, including high back pressure and power consumption due to extremely high shear viscosity, and partly because of film surface defects due to melt fracture.

Accordingly, processing aids have been employed in conjunction with the linear low density polyethylene resins to improve those processing characteristics. For example, the extrudability of film grade LLDPE with narrow molecular weight distribution can be improved by blending. Binary blends containing high amounts (10 to 15%) of polypropylene or polystyrene with the LLDPE exhibit improved processing characteristics, but the high levels (10 to 15%) of polypropylene or polystyrene reduce the properties of the base LLDPE so greatly that little or no property advantages are seen in using the LLDPE.

Extrusion of these binary blends, even containing lower amounts of either polypropylene or polystyrene, results uniformly in products of unacceptable appearance. Particularly, these products consistently exhibit melt fracture and a surface of irregularities which are striated or wavy in configuration. Most attempts at remedies of melt fracture are physical or mechanical in nature. For example, it has been proposed to vary die geometry and increasing dies gap. These are solutions which invoke other problems. Modification of die geometry is costly and increasing dies gap or processing temperature create the problem of bubble instability for the blown film processing.

SUMMARY OF THE INVENTION

In accordance with the invention a linear low density polyethylene, or a blend thereof, is coextruded with a compostion containing a LDPE and/or HDPE. The product exhibits good processability with substantial retention of inherent properties of the LLDPE.

In accordance with the invention a linear low density polyethylene is coextruded with a composition containing a LDPE and/or HDPE. The product film exhibits substantially no melt fracture and no surface defects.

In accordance with the invention a linear low density polyethylene is coextruded with a LDPE and/or HDPE, to produce a product which exhibits good processability with substantial retention of inherent properties of the LLDPE and which is free of melt fracture and substantially free of surface defects.

DETAILED DESCRIPTION OF THE INVENTION

The composite film of the invention comprises two lamina. One of the two lamina comprises LLDPE and/or a LLDPE blend, which constitutes a substantial portion of the composite, as a base layer. The second lamina comprises HDPE, LDPE or admixtures thereof. Coextrusion of the compositions of these two lamina results in a LLDPE film free of melt fracture. Accordingly, the composite of the invention can be said to consist essentially of these two laminae.

In accordance with the invention a substantial LLDPE component and a lesser quantity of a composition containing polystyrene is coextruded with a polymer selected from the group consisting of LDPE, HDPE and admixtures thereof. The product is substantially free of melt fracture and free of surface defects.

The base layer can comprise linear low density polyethylene or linear low density polyethylene blended with polystyrene. Linear low density ethylene copolymers (LLDPE) of this invention are linear copolymers of ethylene and a minor amount, preferably about 2 to 10 wt. %, of an olefin, preferably a 1-olefin, containing 4 to 10 carbon atoms and having a density of about 0.9 to 0.94, a melting point of about 110° to 130° C., and a melt index of about 0.2 to 10. The preferred olefin co-monomers are 1-butene, 1-hexene and 1-octene. The LLDPE may be prepared by any of various methods known in the art, e.g., by relatively low pressure methods as disclosed, for example, in U.S. Pat. No. 4,076,698, or by relatively high pressure methods, as disclosed, for example, in U.S. Pat. Nos. 4,405,774 and 4,530,983. LLDPE exhibits a density of less than 0.94 g/cm$^3$.

The LLDPE blends which are coextruded in accordance with the invention can contain up to 15%, generally up to to 10% and most preferably 0.5 to 5% of polystyrene (percentage based on the blend.) Preferably, the polystyrene is a polystyrene homopolymer. However, poly(para-methylstyrene) resins may be employed as partial or complete substitutes for the polystyrene. Moreover, the aromatic polymer can also contain comonomers providing that the aromatic monomer is the predominat constituent. For instance, high impact polystyrene can be used.

The LLDPE base layer comprises more than 50% of the composite, preferably more than 70% of the composite, most preferably more than 75% of the composite, The second layer coextruded with the LLDPE containing HDPE, LDPE or admixtures thereof, comprises less than 30 weight percent of the composite. In Examples below the second layer comprises up to 25% of the composite. In Examples below the second layer can comprises up to 20% of the composite, and even up to to 10% of the composite.

The LDPE and HDPE compositions are well known in the art and are commercially available. LDPE, an acronym for low density polyethylene, its physical and chemical properties and its productsion, is described in KIRK OTHMER, *Encyclopedia of Chemical Technology,* Third Edition, Vol. 16, pages 402–420 (1981). LDPE is generally produced by high pressure methods, compared to those used for LLDPE production HDPE, and acronym for high density polyethylene, is described in KIRK OTHMER, *Encyclopedia of Chemi-* cal Technology, Third Edition, Vol. 16, pages 421–433 (1981). HDPE has a density of at least 0.94 g/cm³.

The lamina or blends used in the invention can contain commercial quantities of color and antiblocking agents. In addition to the polymer components, the blend may also contain any of various additives conventionally added to polymer compositions for different purposes, such as microtalc, stabilizers, compatibilizers, pigments, etc.

The blends used in the invention may be prepared using any of various methods known in the art. For example, pellets of the two polymers may be dry blended and the blend added directly to a blown film extruder, e.g., a Sterling extruder, to produce films having a thickness, for example, of about 0.5 to 5 mils. Blown film is relatively thin as compared to film or sheet used in molding operations and is generally used in flexible packaging. In this process a narrow molecular weight distribution polymer is melt extruded through an extruder. Tubular products, for example, bags, can be produced. The tube may also be slit to form flat film. The film may also be oriented.

The following examples further illustrate the invention.

EXAMPLES

Films were made in a 2½ inch Sterling film extruder with a 6 inch annular die with two layer coextrusion via two 2½ extruders.

The LLDPE used in these examples was hexene copolymer of polyethylene from Mobil (NXT-081, MI=0.65 and density=0.922 g/cm³.) The polystyrene (PS) was from Mobil (PS 2120). The high density polyethylene (HDPE) was from Mobil (HTA -101) and from Cain (L5005). The low density polyethylene (LDPE) was from Mobil (LCA 113 and LBA 133).

The results are set forth in the following Table:

| Resin | Layer Ratio | Melt Fracture | Surface Appearance | Surface Texture |
|---|---|---|---|---|
| LLDPE + PS/ LLDPE + PS | 90/10 | Severe | Wavy | Same |
| LLDPE + PS/ LLDPE + PS | 80/20 | Severe | Wavy | Same |
| LLDPE + PS/ HDPE | 90/10 | None | Smooth | Differential |
| LLDPE + PS/ HDPE | 80/20 | None | Smooth | Differential |
| LLDPE + PS/ HDPE + LDPE | 80/20 | None | Smooth | Differential |
| LLDPE + PS/ LDPE | 90/10 | Slight | Smooth | Differential |
| LLDPE + PS/ LDPE | 75/25 | None | Smooth | Differential |

LLDPE + PS = 96.5/3.5 of LLDPE/PS
HDPE + LDPE = 90/10 of HDPE/LDPE

By way of explanation it is noted that LLDPE was contained in a blend of LLDPE and PS (polystyrene.)

Thus it is apparent that there has been provided, in accordance with the invention, a polymeric composite that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A linear low density polyethylene film composite which is formed by coextrusion and which is free of melt fracture, comprising
    A) a layer of linear low density polyethylene (LLDPE) blended with polystyrene which layer comprises at least 70 weight percent of the composite wherein the blend comprises 0.5 to 5 weight percent of polystyrene.
    B) a second lamina comprising less than 30 weight percent of the composite and containing a resin selected from the group consisting of high density polyethylene, low density polyethylene and admixtures thereof.

2. The linear low density film composite of claim 1, wherein the second lamina is high density polyethylene.

3. The linear low density film composite of claim 1, wherein the second lamina comprises low density polyethylene, produced from a high pressure process.

4. The linear low density film composite of claim 3, wherein the second lamina is a blend which further comprises high density polyethylene.

5. The linear low density film composite of claim 1, wherein second layer comprises up to 25% of the composite.

6. The linear low density film composite of claim 1, wherein the second layer can comprise up to 20% of the composite.

7. The linear low density film composite of claim 1, wherein the second layer can comprise up to to 90% of the composite.

8. In a process for extruding LLDPE compositions into film, the modification comprising
    coextruding a LLDPE blend with a resin component selected from the group consisting of HDPE, LDPE and admixtures thereof; wherein the blend comprises 0.5 to 5 weight percent of polystyrene and forming a composite of claim 1.

9. In a process for extruding LLDPE compositions into film, the modification comprising
    coextruding LLDPE with a resin component selected from the group consisting of HDPE, LDPE and admixtures thereof; and
    forming a composite of claim 2.

10. In a process for extruding LLDPE compositions into film, the modification comprising
    coextruding LLDPE with a resin component selected from the group consisting of HDPE, LDPE and admixtures thereof; and
    forming a composite of claim 3.

11. In a process for extruding LLDPE compositions into film, the modification comprising
    coextruding LLDPE with a resin component selected from the group consisting of HDPE, LDPE and admixtures thereof; and
    forming a composite of claim 4.

12. In a process for extruding LLDPE compositions into film, the modification comprising
    coextruding LLDPE with a resin component selected from the group consisting of HDPE, LDPE and admixtures thereof; and
    forming a composite of claim 5.

13. In a process for extruding LLDPE compositions into film, the modification comprising coextruding LLDPE with a resin component selected from the group consisting of HDPE, LDPE and admixtures thereof;

forming a composite of claim 6.

14. In a process for extruding LLDPE compositions into film, the modification comprising coextruding LLDPE with a resin component selected from the group consisting of HDPE, LDPE and admixtures thereof; and forming a composite of claim 7.

15. A LLDPE composite film free of melt fracture produced by the process of claim 8.

16. A LLDPE composite film free of melt fracture produced by the process of claim 9.

17. A LLDPE composite film free of melt fracture produced by the process of claim 10.

18. A LLDPE composite film free of melt fracture produced by the process of claim 11.

19. A LLDPE composite film free of melt fracture produced by the process of claim 12.

20. A LLDPE composite film free of melt fracture produced by the process of claim 13.

21. A LLDPE composite film free of melt fracture produced by the process of claim 14.

* * * * *